(12) United States Patent
Lee et al.

(10) Patent No.: US 8,947,601 B2
(45) Date of Patent: Feb. 3, 2015

(54) IMAGE PROCESSING APPARATUS AND METHOD

(75) Inventors: Hyeon-ji Lee, Seoul (KR); Chang-soo Lee, Seoul (KR); Sang-hee Lee, Seoul (KR); Dong-heon Lee, Seoul (KR); Joon-ho Phang, Seoul (KR); Yeo-ri Yoon, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 613 days.

(21) Appl. No.: 12/781,553

(22) Filed: May 17, 2010

(65) Prior Publication Data

US 2011/0075033 A1 Mar. 31, 2011

(30) Foreign Application Priority Data

Sep. 28, 2009 (KR) .................. 10-2009-0091838

(51) Int. Cl.
- H04N 5/00 (2011.01)
- H04N 5/77 (2006.01)
- G06F 17/30 (2006.01)
- G11B 27/10 (2006.01)
- G11B 27/34 (2006.01)
- H04N 21/422 (2011.01)
- H04N 21/4402 (2011.01)
- H04N 21/482 (2011.01)
- H04N 21/81 (2011.01)

(52) U.S. Cl.
CPC .............. *H04N 5/77* (2013.01); *G06F 17/3025* (2013.01); *G11B 27/105* (2013.01); *G11B 27/34* (2013.01); *H04N 21/42204* (2013.01); *H04N 21/440263* (2013.01); *H04N 21/4828* (2013.01); *H04N 21/8153* (2013.01)

USPC ......................... 348/734; 348/563; 348/569

(58) Field of Classification Search
USPC ......... 348/734, 114, 571, 563–565, 569, 731, 348/552–554; 715/716–722; 725/39–55, 725/116
IPC .......................................................... H04N 5/00
See application file for complete search history.

(56) References Cited

U.S. PATENT DOCUMENTS 5,598,523 A * 1/1997 Fujita .............................. 715/840
6,481,011 B1 * 11/2002 Lemmons ........................ 725/47

(Continued)

FOREIGN PATENT DOCUMENTS

| EP | 1 909 499 A1 | 4/2008 |
| EP | 2 000 892 A2 | 12/2008 |

(Continued)

OTHER PUBLICATIONS

Communication and Extended European Search Report, dated Nov. 23, 2010, issued in counterpart European Application No. 10167334.1.

(Continued)

*Primary Examiner* — Trang U Tran
(74) *Attorney, Agent, or Firm* — Sughrue Mion, PLLC

(57) ABSTRACT

An image processing apparatus and image processing method are provided. The image processing apparatus includes a video processor which processes and displays an image; a receiver which receives a key signal of a color; and a controller which controls the video processor to display contents corresponding to the color when receiving the key signal of the color.

23 Claims, 8 Drawing Sheets

(56) References Cited

U.S. PATENT DOCUMENTS

| | | | |
|---|---|---|---|
| 6,493,688 B1 * | 12/2002 | Das et al. | 706/20 |
| 7,610,555 B2 * | 10/2009 | Klein et al. | 715/738 |
| 2004/0255325 A1 | 12/2004 | Furui et al. | |
| 2007/0240186 A1 | 10/2007 | Silver et al. | |
| 2008/0136906 A1 | 6/2008 | Park et al. | |

FOREIGN PATENT DOCUMENTS

| | | |
|---|---|---|
| JP | 2005-006042 A | 1/2005 |
| JP | 2005-285039 A | 10/2005 |
| JP | 2007-11696 A | 1/2007 |
| JP | 2007-129331 A | 5/2007 |
| JP | 2008-158734 A | 7/2008 |
| WO | 2008/032353 A1 | 3/2008 |
| WO | 2009/081330 A2 | 7/2009 |

OTHER PUBLICATIONS

Communication dated Apr. 25, 2012 issued by the European Patent Office in corresponding European Application No. 10 167 334.1.
Communication dated May 7, 2013 issued by the European Patent Office in counterpart European Patent Application No. 10167334.1.
Communication dated Feb. 4, 2014 issued by the Japanese Patent Office in counterpart Japanese Patent Application No. 2010-180773.
Communication dated Mar. 12, 2014 issued by the European Patent Office in counterpart European Patent Application No. 10 167 334.1.
Shiitani, Shuichi et al., "An Online Shopping Service Using the Color Feature of Goods," Information Processing Society Research Report, vol. 2002, No. 6 2002-GN-42, Jan. 24, 2002, 8 pages total.
Communication from the Japanese Patent Office dated Sep. 2, 2014, in a counterpart Japanese application No. 2010-180773.
Communication from the European Patent Office issued Jun. 18, 2014 in a counterpart European Application No. 14165256.0.

* cited by examiner

IMAGE PROCESSING APPARATUS AND METHOD

CROSS-REFERENCE TO RELATED APPLICATION

This application claims priority from Korean Patent Application No. 10-2009-0091838, filed on Sep. 28, 2009 in the Korean Intellectual Property Office, the disclosure of which is herein incorporated by reference in its entirety.

BACKGROUND

1. Field

Apparatuses and methods consistent with exemplary embodiments relate to image processing, and more particularly, to an image processing apparatus and method which can provide a content searching method for intuitively and easily searching desired contents through color keys of a remote controller.

2. Description of the Related Art

To search contents stored in an image processing apparatus or contents stored in an external storage medium connected to the image processing apparatus, a user has to undergo many steps of key input. For example, to search a photo having a specific color, a user has to sequentially perform steps of entering a photo browser, changing "folder sorting (basic sorting)" into "color sorting," and searching the photos according to colors. In this case, a user has to select left and right buttons for a desired color after selecting the "color sorting" in a media play so as to see corresponding photos. Also, a user has to move a highlight downward for selecting a desired photo. Further, to select another color, a user has to move the highlight upward again and change the color.

Accordingly, in order to see photos corresponding to a desired color, a user has to move a highlight many times using four arrow keys of a remote controller.

SUMMARY OF THE INVENTION

Exemplary embodiments provide a content searching method for intuitively and easily searching desired contents using color keys of a remote controller.

According to an aspect of an exemplary embodiment, there is provided an image processing apparatus including: a video processor which processes and displays an image; a receiver which receives a key signal of a predetermined color; and a controller which controls the video processor to display contents corresponding to the color when receiving the key signal of the color.

The contents corresponding to the color may include contents containing the color. The controller may control the video processor to display contents containing a color obtained by mixing colors if receiving at least two key signals of the colors at the same time. The controller may control the video processor to sequentially display contents including colors in order of reception if receiving at least two key signals of the colors in sequence. The controller may control the video processor to display contents containing a threshold percentage or more of the color. The contents corresponding to the color may include contents that belong to a category corresponding to the color. The contents corresponding to the color may include contents that belong to a genre corresponding to the color. The controller may provide a user interface through which a user can set up a color corresponding to a content genre. The controller may control the video processor to display the contents in various types depending on receiving times or a receiving time of the key signal of the color, or both. The contents may include an image, a moving picture, a document or a broadcast, or a combination of two or more thereof.

According to an aspect of another exemplary embodiment, there is provided an image processing method including: receiving a key signal of a color; and displaying contents corresponding to the color when receiving the key signal of the color.

The contents corresponding to the color may include contents containing the color. Contents containing a color obtained by mixing colors may be displayed if at least two key signals of the colors are received simultaneously. Contents including colors may be sequentially displayed in order of reception if at least two key signals of the colors are received in sequence. Contents containing a threshold percentage or more of the color may be displayed. The contents corresponding to the color may include contents that belong to a category corresponding to the color. The contents corresponding to the color may include contents that belong to a genre corresponding to the color. A user interface may be provided for allowing a user to set up a color corresponding to a content genre. The contents may be displayed in various types depending on receiving times or a receiving time of the key signal of the color, or both. The contents may include an image, a moving picture, a document or a broadcast, or a combination of two or more thereof.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION

Figure 1:
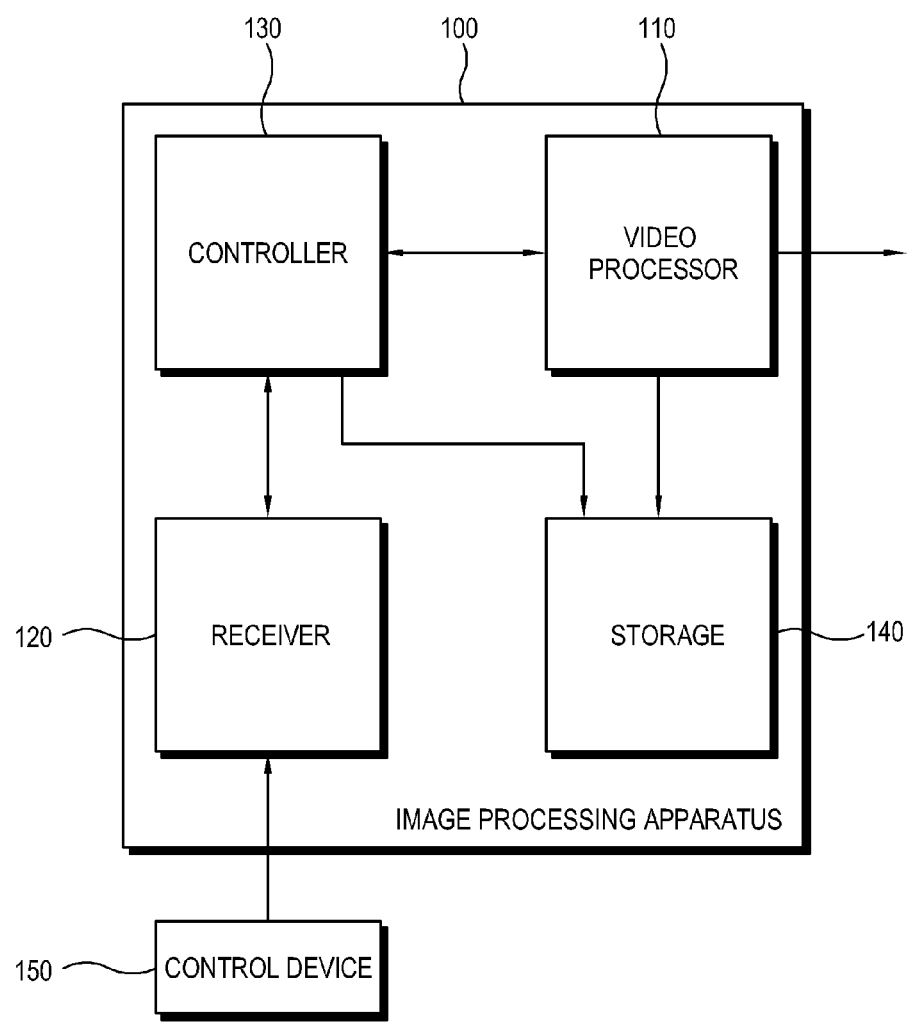
FIG. 1 is a block diagram of an image processing apparatus according to an exemplary embodiment.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

FIG. 1 is a block diagram of an image processing apparatus according to an exemplary embodiment.

An image processing apparatus 100 may include a television (TV), a personal computer (PC), a mobile terminal, a digital versatile disc (DVD) player, or the like. Further, the inventive concept may be applied to any electronic device that can perform a plurality of functions in response to key input.

The image processing apparatus 100 in this exemplary embodiment may include a video processor 110, a receiver 120, a controller 130 and a storage 140.

The video processor 110 can process and display an image. Specifically, the video processor 110 may display contents that belong to a certain category or a certain genre. The contents may include an image, a moving picture, a document or a broadcast, or the like, or a combination of two or more thereof.

Further, the video processor 110 may include a display panel (not shown) achieved in the form of a liquid crystal display (LCD), an organic light emitting diode (OLED), a plasma display panel (PDP), etc.

The receiver 120 can receive a key signal corresponding to a certain color. The certain color may be predetermined.

In this exemplary embodiment, the receiver 120 may receive a color key signal from a control device 150 such as a remote controller or the like. In this case, a user may press the color keys provided in the control device.

Alternatively, the receiver 120 may receive a color key signal input corresponding to a key button provided in the image processing apparatus 100. In this case, a user may press the color key provided in the image processing apparatus 100.

The controller 130 can control the video processor 110 to display contents corresponding to a certain color if receiving a key signal of the color.

According to an exemplary embodiment, the contents corresponding to the color may be contents containing the color.

That is, the controller 130 can control the video processor 110 to display contents including a certain color if receiving a key signal of the color. In this case, the controller 130 may control the video processor 110 to display contents containing a threshold percentage or more of the color.

If receiving at least two color key signals simultaneously, the controller 130 may control the video processor 110 to display contents containing a color obtained by mixing the received colors. For example, if the receiver receives color key signals of red and yellow simultaneously, the controller 130 may control the video processor 110 to display contents containing an orange color which is obtained by mixing the red and yellow colors.

Also, if receiving at least two color key signals in sequence, the controller 130 may control the video processor 110 to sequentially display contents containing the colors in order of reception.

According to another exemplary embodiment, the contents corresponding to a color may be contents that belong to a category set up corresponding to the color.

If receiving a certain color key signal, the controller 130 may control the video processor 110 to display contents that belong to a category set up corresponding to the color.

According to still another exemplary embodiment, the content corresponding to a color may be contents that belong to a genre set up corresponding to the color.

If receiving a certain color key signal, the controller 130 may control the video processor 110 to display contents that belong to a genre set up corresponding to the color. In this case, the controller 130 may provide a user interface through which a user can set up a color corresponding to a content genre.

The controller 130 may control the video processor 110 to display the contents of various types depending on receiving times or a receiving time of the certain color key signal, or some combination thereof.

The storage 140 may sort the contents with respect to a color, a category or a genre, or a combination of one or more thereof, and store the contents.

Figure 2:
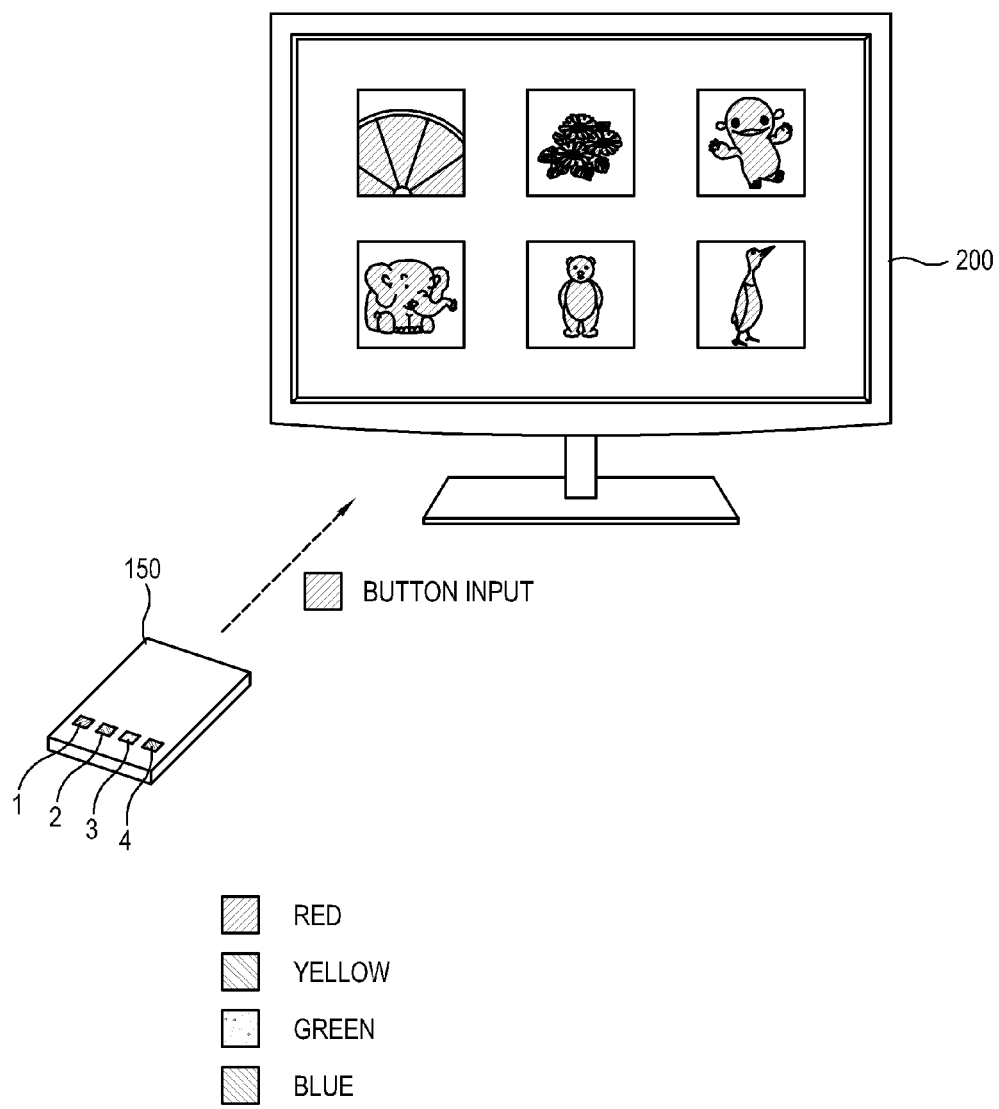
FIG. 2 shows contents searched according to an exemplary embodiment.

FIG. 2 shows contents searched according to an exemplary embodiment.

In this exemplary embodiment, when receiving a key signal of a certain color, the image processing apparatus 100 may display contents containing the color.

As shown in FIG. 2, if a user inputs a red key 1 among color keys of the remote controller, the image processing apparatus 100 searches contents for red-oriented photos and displays the red-oriented photos on a screen 200. Thus, one input of the color key is enough for a user to directly search the contents of a desired color.

Figure 3:
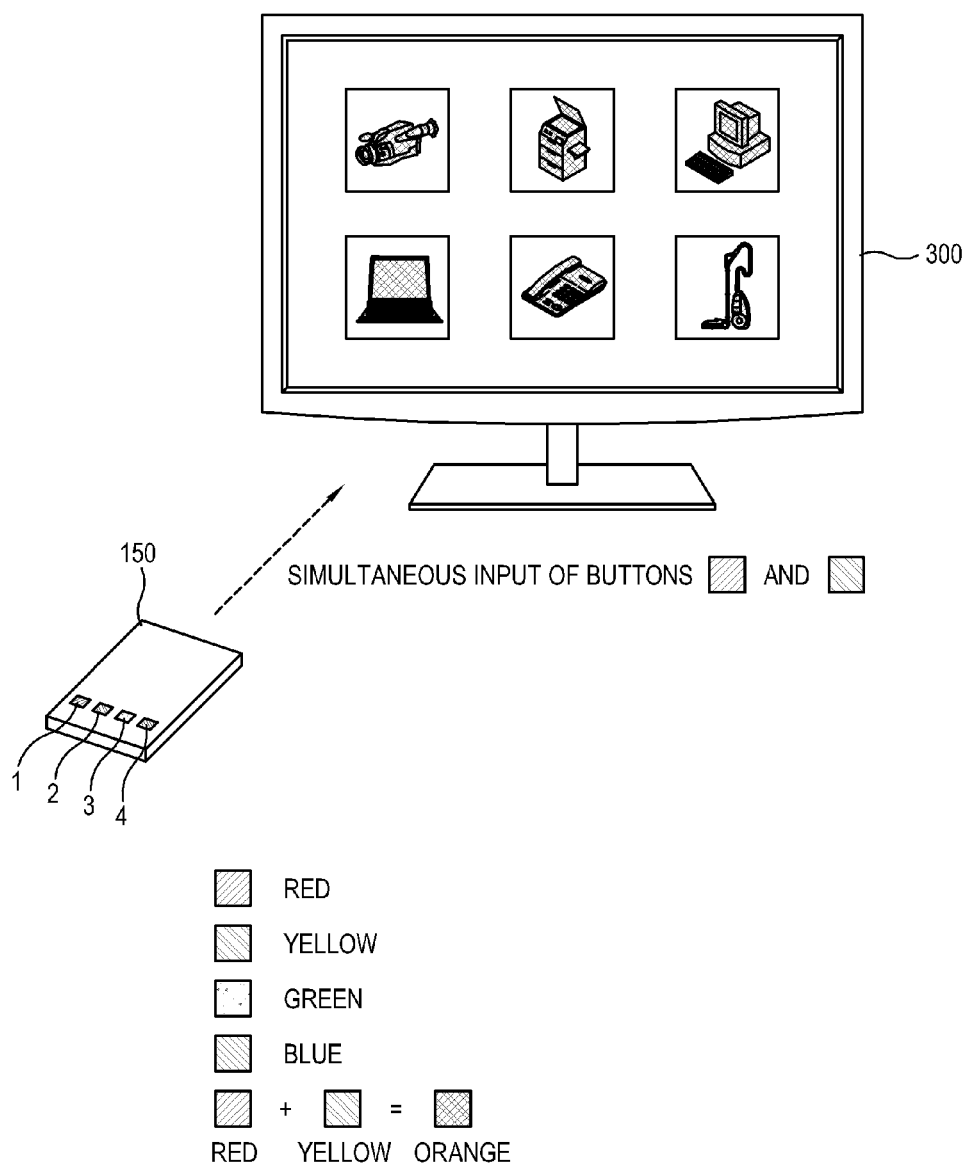
FIG. 3 shows contents searched according to another exemplary embodiment.

FIG. 3 shows contents searched according to another exemplary embodiment.

In this exemplary embodiment, when receiving at least two key signals of colors simultaneously, the image processing apparatus 100 may display contents containing a color obtained by mixing the received colors.

As shown in FIG. 3, if a user inputs a red key 1 and a yellow key 2 among the color keys of the remote controller at the same time, the image processing apparatus 100 searches contents for orange-oriented photos obtained by combining red and yellow, and displays the orange-oriented photos on the screen 300. Likewise, if a user inputs the red key 1 and a blue key 4 simultaneously, the image processing apparatus 100 searches contents and displays violet-oriented photos. Here, a user may input three or more keys at the same time. Thus, a user may directly search photos of various colors on the basis of various combinations of the color keys.

Figure 4:
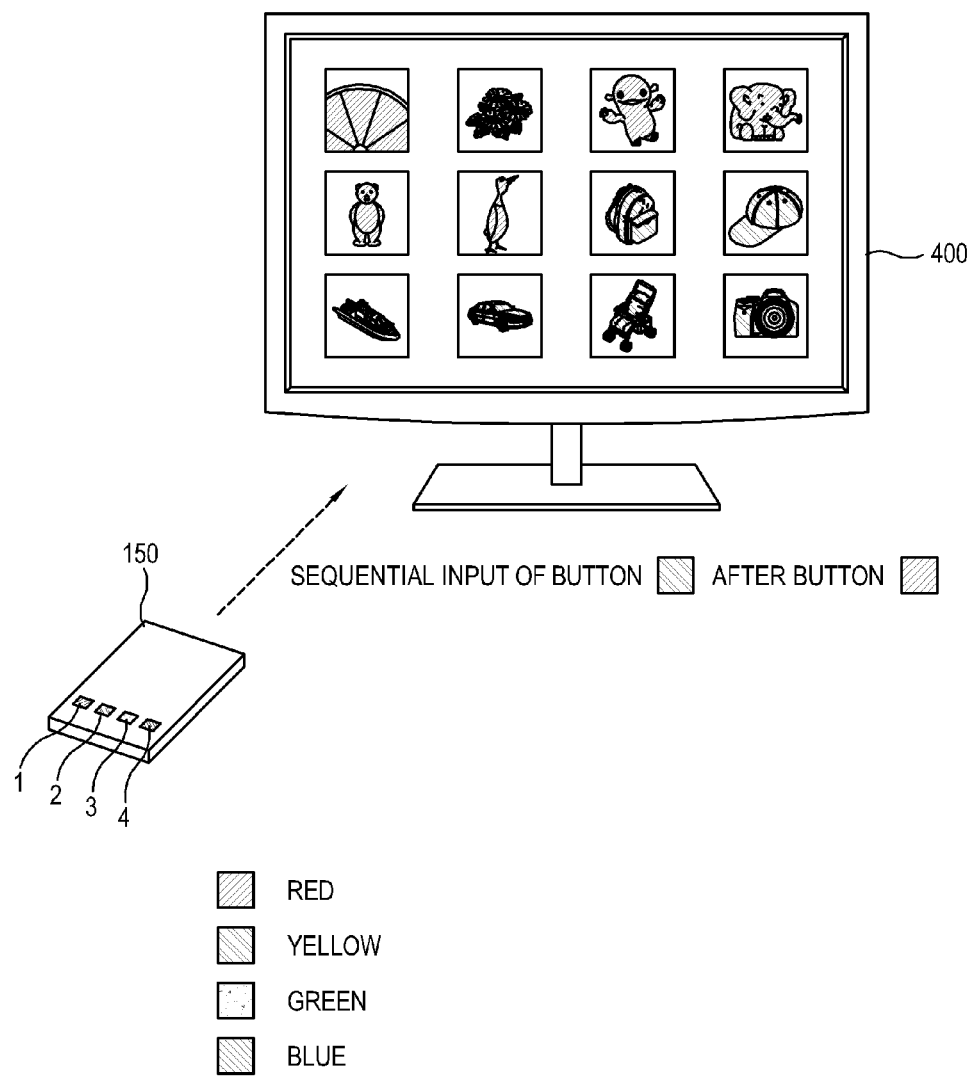
FIG. 4 shows contents searched according to still another exemplary embodiment.

FIG. 4 shows contents searched according to still another exemplary embodiment.

In this exemplary embodiment, when receiving at least two key signals of colors in sequence, the image processing apparatus 100 may display contents containing the colors in order of reception.

As shown in FIG. 4, if a user sequentially inputs the red key 1 and the yellow key 2 among the color keys of the remote controller, the image processing apparatus 100 searches contents for red-oriented photos and yellow-oriented photos and displays the red-oriented photos and the yellow-oriented photos on the screen 400. In this case, the red-oriented photos may be displayed first based on the order of the color key input. For example, referring to FIG. 4, six photos shown from a left top portion are the red-oriented photos shown in FIG. 2, and the next six photos are the yellow-oriented photos. Thus, a user can directly search the photos of various colors at once.

Alternatively, when receiving at least two key signals of colors simultaneously, the image processing apparatus 100 may display contents including all the received colors. For example, if a user inputs the red key 1 and the yellow key 2 among the color keys of the remote controller, the image processing apparatus 100 searches contents and displays the red- and yellow-oriented photos, rather than photos having a mix of the red and yellow colors.

Figure 5:
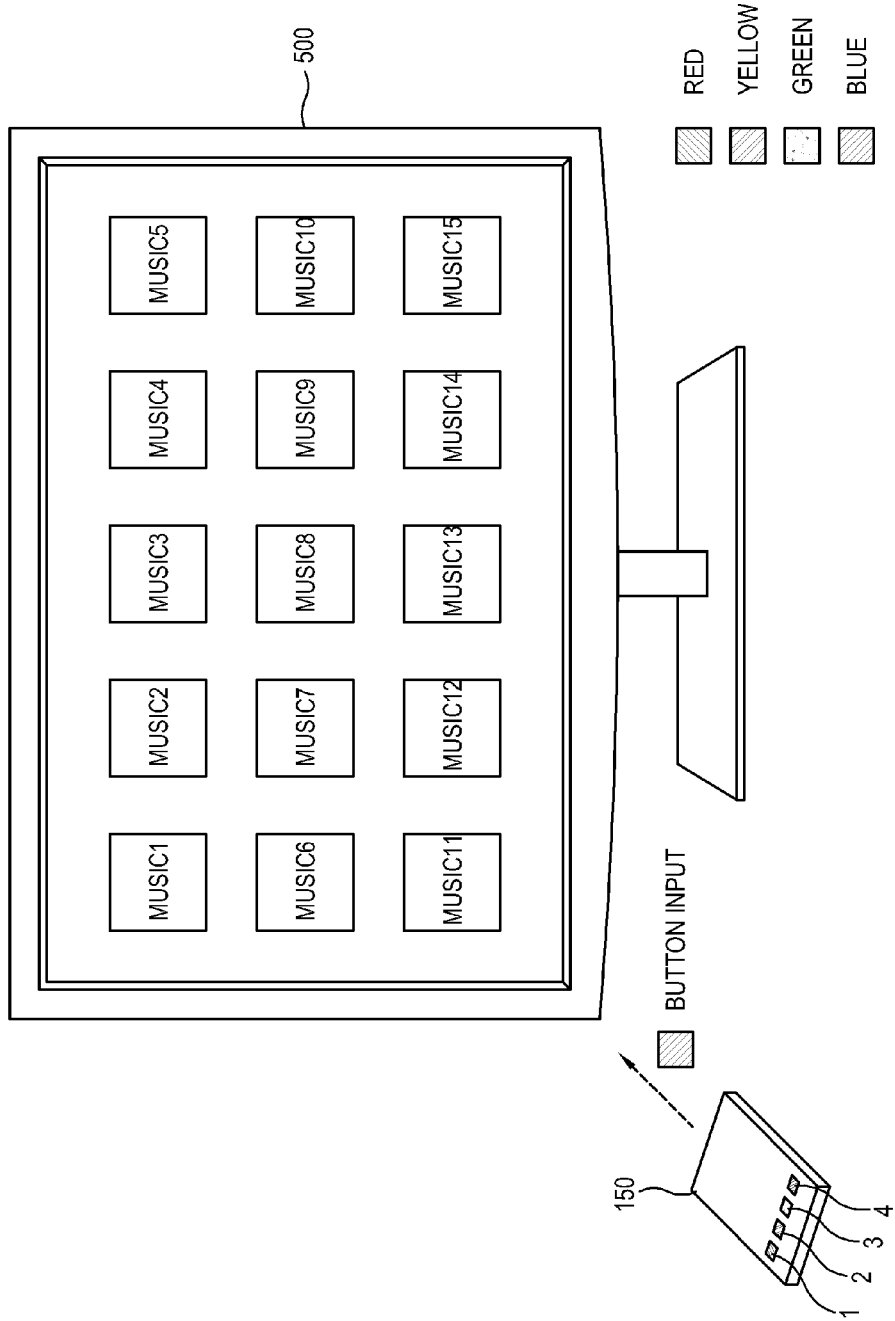
FIG. 5 shows contents searched according to still another exemplary embodiment.

FIG. 5 shows contents searched according to still another exemplary embodiment.

In this exemplary embodiment, when receiving a key signal of a certain color, the image processing apparatus 100 may display contents that belong to the category set up corresponding to the color.

To this end, a user may perform a setup operation by mapping each color key to contents of a certain category. For example, the red key 1, the yellow key 2, a green key 3, the blue key 4, and a combination of the red key 1 and the yellow key 2 may be mapped with music, a moving picture, an image, a broadcast and a document, respectively. Here, the maximum number of categories to be directly searched by four color keys is twelve. However, if a different number of keys are used, the maximum number of categories will change accordingly.

As shown in FIG. 5, if a user presses the red key 1 among the color keys of the remote controller, the image processing apparatus 100 searches the contents for contents that belong to a music category, and displays the contents that belong to a music category on a screen 500. Thus, one input of the color key is enough for a user to directly search contents from a desired category.

Alternatively, when receiving a key signal of a certain color, the image processing apparatus 100 may display contents that belong to a genre set up corresponding to the color. In this case, the controller 130 may provide a user with a user interface through which the user can set up a color corresponding to a genre of contents. For instance, the red key 1, the yellow key 2, the green key 3, and the blue key 4 may be mapped with jazz, pop, classic, and Korean songs, respectively. If a user inputs the red key 1 among the color keys of the remote controller, the image processing apparatus 100 may search the contents and display the contents that belong to a genre of jazz.

Figure 6:
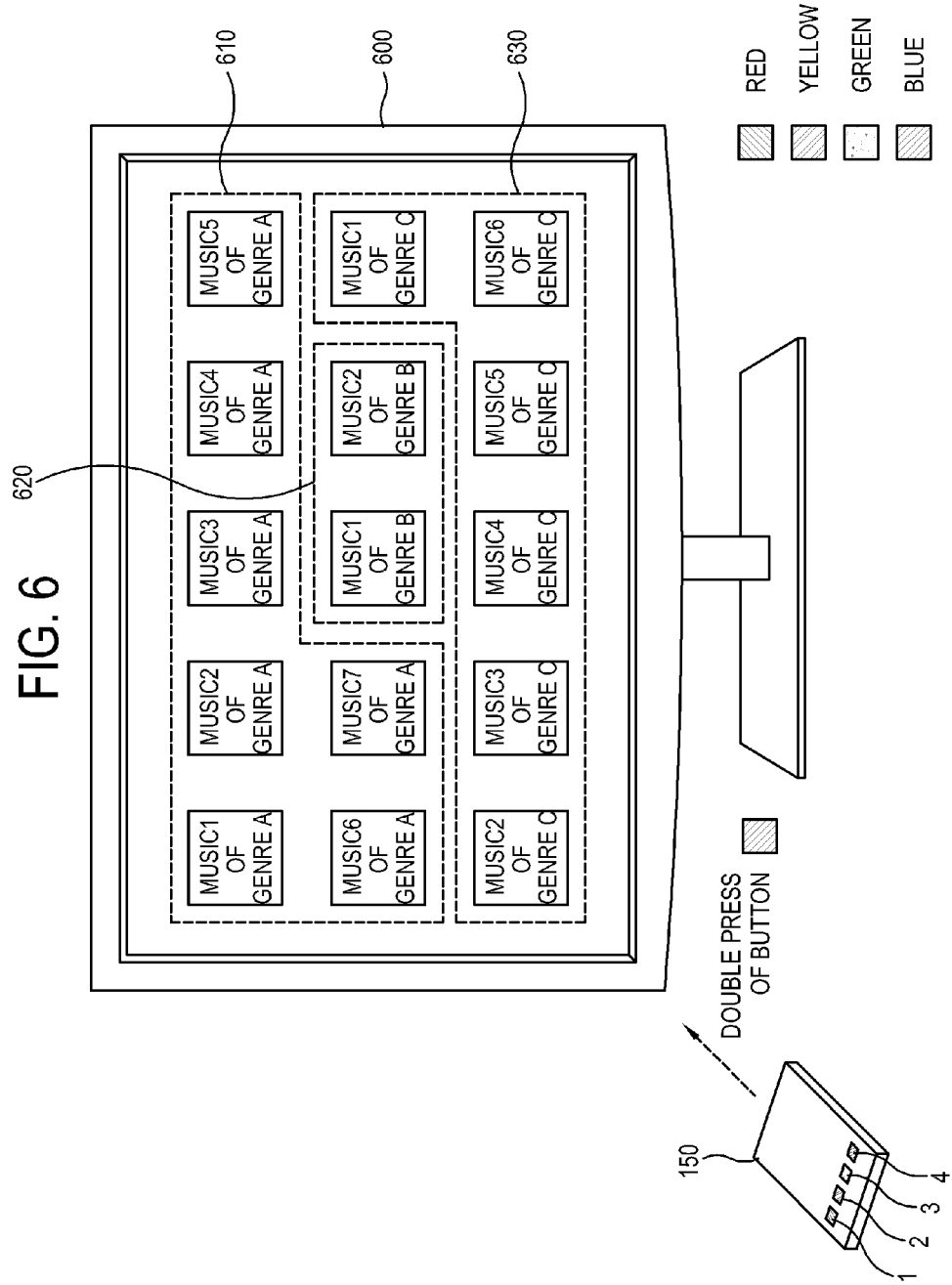
FIG. 6 shows contents searched according to still another exemplary embodiment.

FIG. 6 shows contents searched according to still another exemplary embodiment;

In this exemplary embodiment, the image processing apparatus 100 may display the contents in various forms depending on the receiving times and the receiving time of a certain-color key signal. Specifically, the image processing apparatus 100 may search the contents of the category set up corresponding to the color and display the contents sorted according to genres.

For this, a user may set up contents of certain categories to be mapped to respective color keys, and display types to be mapped with a number of times of input and an input time of the respective color keys. For example, the red key 1, the yellow key 2, the green key 3, the blue key 4 and a combination of the red key 1 and the yellow key 2 may be mapped with music, a moving picture, an image, a broadcast and a document, respectively. Also, double presses of the color key may be mapped with displaying the contents sorted according to genres, and a long press of the color key may be mapped with displaying the contents in order of the latest contents to be stored, that is, the most recently stored contents.

As shown in FIG. 6, if a user double-presses the red key 1 among the color keys of the remote controller, the image processing apparatus 100 searches the contents and displays the contents that belong to the music category, and displays the contents that belong to the music category sorted according to genres. Specifically, the contents of the music category are sorted corresponding to a genre A 610, a genre B 620 and a genre C 630 and displayed on a screen 600.

Meanwhile, the embodiment referring to FIGS. 2 to 6 was described on the assumption that a user carries out the input using the color keys provided in the control device 150, but a user may alternatively use color keys provided in the image processing apparatus 100 in a modified exemplary embodiment.

Figure 7:
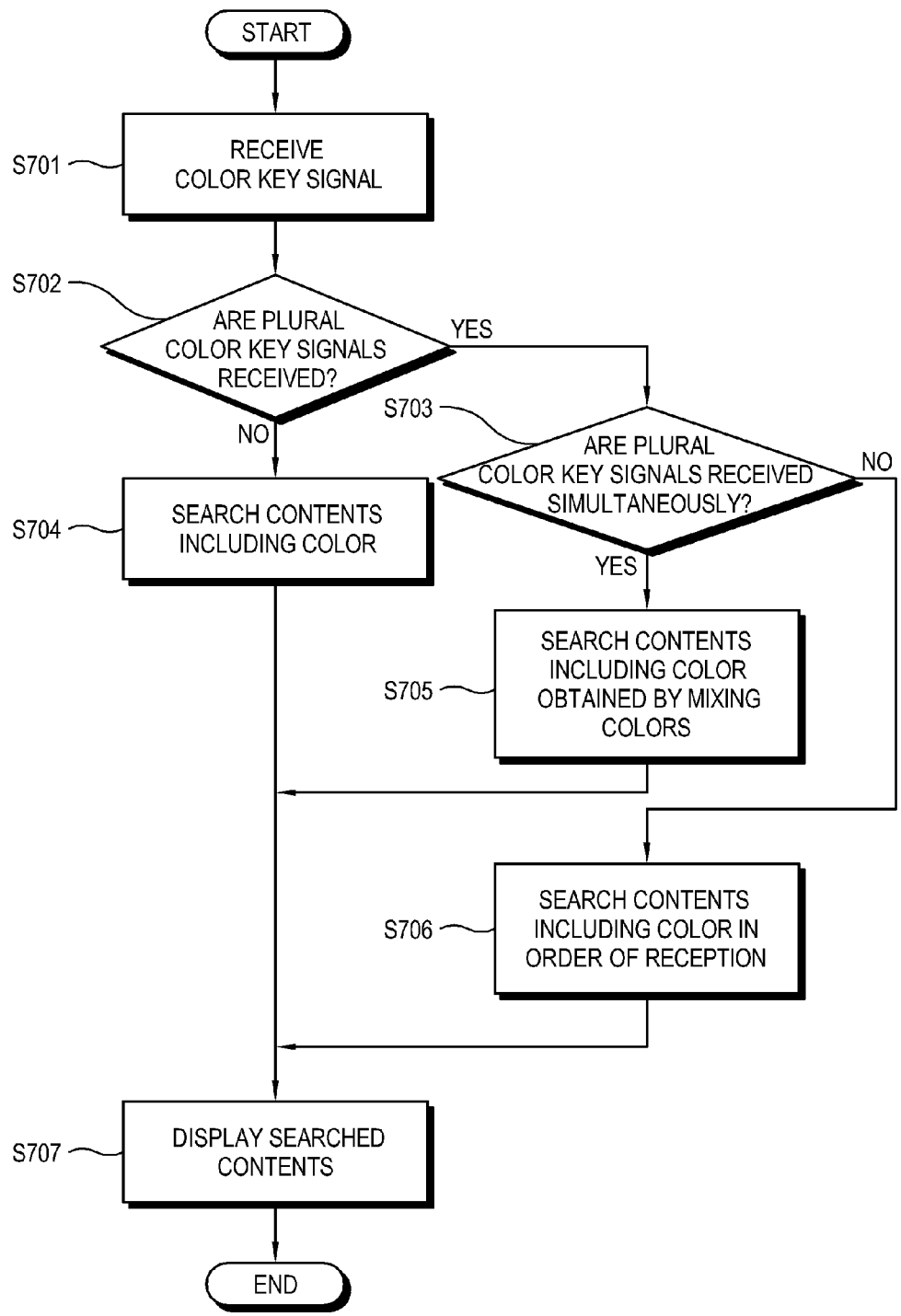
FIG. 7 is a flowchart of an example of searching contents according to an exemplary embodiment.

FIG. 7 is a flowchart illustrating an example of searching contents according to an exemplary embodiment.

At operation S701, the image processing apparatus 100 receives a color key signal.

At operation S702, the image processing apparatus 100 determines whether a plurality of color key signals are received.

If it is determined that a plurality of color key signals are not received (S702-N), the image processing apparatus 100 searches the contents for contents containing the color at operation S704. For instance, as discussed above, the image processing apparatus 100 may search the above color-oriented contents or the contents containing a threshold percentage or more of the above color.

If it is determined that a plurality of color key signals are received (S702-Y), the image processing apparatus 100 determines whether the plurality of color key signals are received at the same time, at operation S703.

If it is determined that a plurality of color key signals are received at the same time (S703-Y), the image processing apparatus 100 searches the contents for contents containing a color obtained by mixing the received colors at operation S705.

If it is determined that a plurality of color key signals are not received at the same time (S703-N), the image processing apparatus 100 sequentially searches the contents for contents containing the colors in order of reception at operation S706.

At operation S707, the image processing apparatus 100 displays the searched contents.

Figure 8:
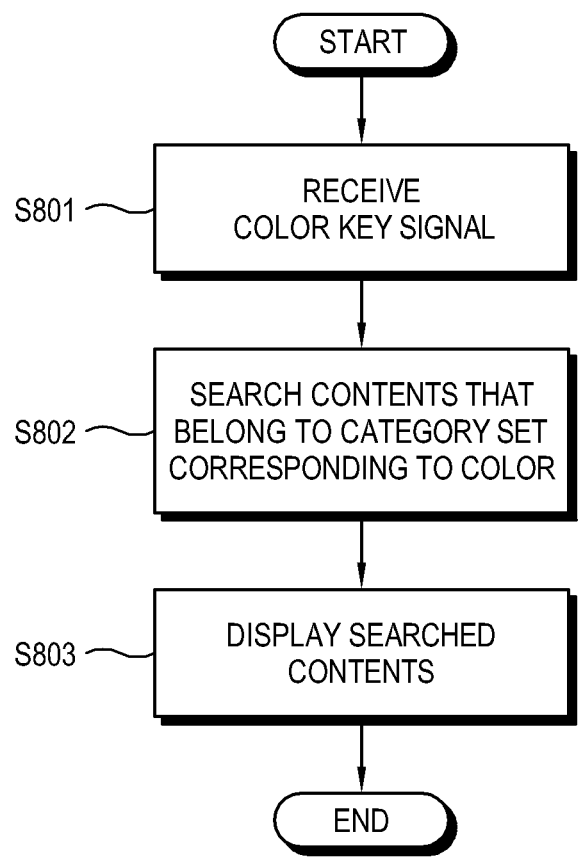
FIG. 8 is a flowchart of an example of searching contents according to another exemplary embodiment.

FIG. 8 is a flowchart illustrating an example of searching contents according to another exemplary embodiment.

At operation S801, the image processing apparatus 100 receives a predetermined-color key signal.

At operation S802, the image processing apparatus 100 searches the contents that belong to a category set up corresponding to the above color. For example, content categories such as music, a moving picture, a broadcast, or the like may be set up to be mapped to the respective color keys.

At operation S803, the image processing apparatus 100 displays the searched contents.

As described above, according to exemplary embodiments, one input of a color key is enough to directly search desired contents, thereby decreasing inconvenience that a user has to undergo many steps. Further, by mapping a category name or a genre of music, a moving picture, etc. to the color keys, one input of the color key is sufficient to easily search contents of a desired category or genre.

Also, there is provided a user interface so that a user can easily use the color key without a specific manipulating method as long as the user can discern colors.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A display apparatus comprising:
an image processor configured to process an image;
a display configured to display the processed image;
a storage configured to stores contents;
a receiver configured to receive at least two user input signals, each user input signal corresponding to a color; and
a controller configured to display a graphical user interface (GUI) for setting the color corresponding to a classification of the contents by a user on the display, perform a control operation for searching the stored contents in response to receiving the at least two user input signals, and control the image processor to process an image of a searched content from among the stored contents corresponding to the colors of the received user input signals to display the processed image of the searched content on the display, wherein when the at least two user input signals are received simultaneously, the controller controls the display to display contents corresponding to a color obtained by mixing colors, and wherein when the at least two user input signals are received sequentially, the controller controls the display to sequentially display contents corresponding to colors in order of reception.

2. The display apparatus according to claim 1, wherein receiver receives the at least two user input signals simultaneously when the receiver receives the at least two user input signals within a predetermined time.

3. The display apparatus according to claim 2, wherein the receiver receives the at least two user input signals in sequence when the receiver receives a second user input signal of the at least two user input signals at a time later than the predetermined time from the first user input signal of the at least two user input signals.

4. The display apparatus according to claim 1, wherein the control operation for searching the stored contents comprises searching for the contents that have a threshold percentage or more of the mixed colors when the at least two user input signals are received simultaneously, or that have a threshold percentage or more of the colors in order of reception when the at least two user input signals are received sequentially.

5. The display apparatus according to claim 1, wherein the contents corresponding to the color comprises contents that belong to a category corresponding to the mixed colors or the colors in order of reception.

6. The display apparatus according to claim 1, wherein the contents corresponding to the color comprises contents that belong to a genre corresponding to the mixed colors or the colors in order of reception.

7. The display apparatus according to claim 1, wherein the controller performs the control operation for searching the stored contents of various types depending on at least one of a number of times the user input signal is received, and a time at which the user input signal is received.

8. The display apparatus according to claim 1, wherein the contents comprises at least one of an image, a moving picture, a document and a broadcast.

9. The content identifying apparatus according to claim 1, wherein each user input signal is a signal indicating only a color of a key.

10. An display method comprising:
storing the contents;
displaying a graphical user interface (GUI) for setting a color corresponding to a classification of the contents by a user;
receiving at least two user input signals, each user input signal corresponding to a color;
performing a control operation for searching the stored contents in response to receiving the at least two user input signals; and
processing an image of a searched content from among the stored contents corresponding to a colors of the received user input signals to display the processed image of the searched content,
wherein when the at least two user input signals are received simultaneously, processing the image comprises displaying contents corresponding to a color obtained by mixing colors, and
wherein when the at least two user input signals are received sequentially, processing the image comprises sequentially displaying contents corresponding to colors in order of reception.

11. The display method according to claim 10, wherein the least two user input signals are received simultaneously when the at least two user input signals are received within a predetermined time.

12. The display method according to claim 10, wherein the at least two user input signals are received in sequence when a second user input signal of the at least two user input signals is received at a time later than the predetermined time from the first user input signal of the at least two user input signals.

13. The display method according to claim 10, wherein the control operation for searching the stored contents comprises searching for the contents that have a threshold percentage or more of the mixed colors when the at least two user input signals are received simultaneously, or that have a threshold percentage or more of the colors in order of reception when the at least two user input signals are received sequentially.

14. The display method according to claim 10, wherein the contents corresponding to the color comprises contents that belong to a category corresponding to the mixed colors or the colors in order of reception.

15. The display method according to claim 10, wherein the contents corresponding to the color comprises contents that belong to a genre corresponding to the mixed colors or the colors in order of reception.

16. The display method according to claim 10, wherein the control operation for searching the stored contents of various types are performed depending on at least one of a number of times the user input signal is received, and a time at which the user input signal is received.

17. The display method according to claim 10, wherein the contents comprises at least one of an image, a moving picture, a document and a broadcast.

18. A content identifying apparatus comprising:
an input unit comprising a plurality of keys, each of the keys assigned to a different color;
a storage which sorts contents with respect to at least one of a color, a category and a genre and stores the contents; and
a controller which, responsive to an actuation of at least two of the plurality of keys, searches the stored contents and identifies at least one of the contents having the colors in the contents that are assigned to the keys which are actuated, sorts contents giving priority to the contents having the colors in the contents, and sends the sorted contents to be displayed,
wherein when the at least two keys are actuated simultaneously, the controller searches the stored contents and identifies at least one of the contents corresponding to a color obtained by mixing the colors assigned to the keys, and
wherein when the at least two keys are actuated sequentially, the controller searches the stored contents and identifies at least one of the contents corresponding to colors assigned to the keys in order of reception.

19. The content identifying apparatus according to claim 18, wherein each key is provided in the color to which the key is assigned.

20. The content identifying apparatus according to claim 18,
wherein the contents are photos, and
the controller identifies photos having the colors by identifying photos that have the colors in the photos.

21. The content identifying apparatus according to claim 18,
wherein the contents are music data, and
the controller identifies music data having the colors in the contents by identifying music data according to a category that is associated with the mixed colors or the colors in order of reception.

22. The content identifying apparatus according to claim 18, wherein the controller identifies contents having in the contents only colors assigned to the keys which are actuated.

23. The content identifying apparatus according to claim 18, wherein each key is assigned to a different color in a one-to-one relationship, such that no two keys have a same color.

\* \* \* \* \*